Patented Apr. 3, 1934

1,953,508

UNITED STATES PATENT OFFICE 1,953,508

COLORING AND PROTECTIVE COATING

Oskar Schober, Horrem, near Cologne, Germany, assignor to American Lurgi Corporation, New York, N. Y., a corporation of New York No Drawing. Application October 18, 1932, Serial No. 638,387. In Germany September 1, 1930

12 Claims. (Cl. 134—76)

This invention relates to coloring and protective coatings.

It has been established that alloys of silicon and aluminum when admixed in finely divided form with binding media are admirably adapted for the production of coloring and protective coatings on substances of the most diverse character, such as iron. These coatings are distinguished by extreme resistance to temperatures up to red heat, and to chemical action, such as corrosion by atmospheric influence, industrial effluent gases and sea air. They are also distinguished by excellent covering and filling properties, coupled with powerful adhesion, thereby affording absolute protection of the surfaces such as the surfaces of objects of iron provided with said coatings, combined with extremely economical consumption of material. Finally, they have an agreeable, warm tone, which is capable of wide variation according to the relative proportions of the components.

In combination with binding media or mixtures of binding media, such as are currently employed in the paint industry, the said basic materials afford the advantage that they produce a particularly dense and homogeneous pigmentation of the entire paint film, a feature that is specially desirable from the point of view of protection against rust, inasmuch as the said dense and homogeneous pigmentation substantially reduces the tendency of the paint film to swell, and greatly increases the adsorptive capacity towards the binding medium, a factor on which, as is known, the intimate character of the structure of the film, and therefore the stability of the aggregate and its resistance to the action of numerous agencies, is largely based.

With regard to the choice of the binding medium employed, this is generally governed from case to case by the requirements to be met by the desired coating, for example, with respect to resistance to heat or to the chemical influence of gases or liquids, the drying period and so forth.

Whereas coatings on a linseed oil basis have proved satisfactory for withstanding for example normal conditions, it is generally advisable where more severe conditions are encountered for example with a view to obtaining increased resistance to chemical influence to add to such binding media a small quantity of copal or the like.

The hereinbefore described alloys have also proved particularly valuable for coating or impregnating wood and other organic substances, for example, in addition to coating metals, such as iron, in that a preservative action is thereby produced on the former, for example against decay and in addition to resistance to the action of decay bacteria, moisture, harmful gases and liquids such as for example sea water, the inflammability of the wood or the like is also reduced if the coating mass be of suitable composition. This is of especial importance for the most numerous modes of application for example of wood, especially in ship building.

As compared with the known coatings produced by applying powdered aluminum (so-called aluminum bronze) by the aid of a binding medium, the coatings furnished by alloys of silicon with aluminum in accordance with the present invention, offer substantial advantages, such as the advantage of their quiet shades, between light and dark grey with a brownish tinge, obtainable by modifying the relative proportions of the components as desired in contradistinction to the glaring silvery metallic sheen of coatings furnished by aluminum which is a drawback for many purposes. They also offer the advantage that their radiation of heat increases with the proportion of silicon present, a circumstance which substantially favours their application, for example, as coatings for radiators or other heat exchangers, by comparison with the known colored coatings of aluminum, which are known to be poor radiators of heat. Also, with regard to their powers of resisting the corrosive action of chemicals, and the high degree of pigmentation achieved when employed with binding media, the new coatings are substantially superior to the known aluminum coatings.

Particular advantage has been found to result from the employment of aluminum-silicon alloys containing not less than 5% of silicon, such as are obtainable in known manner, for example by thermal methods such as smelting substances containing alumina with silica or substances containing silica and with coal, and, in particular, such high-silicon alloys as are obtained as a by-product, by liquation, in the production of alloys lower in silicon from crude alloys of the kind in question, in an equally known manner.

The silicon content of such alloys may vary within any desired limits depending upon the properties which the coatings to be produced are desired to possess. A content of about 20–60% silicon is mentioned merely by way of example as giving excellent results. However, alloys with still higher silicon content and also those with lower silicon content such as for example an eutectic alloy with 87% aluminum and 13% silicon, may be employed depending upon the requirements to be fulfilled by the coating to be produced.

In the presence of aluminum as a constituent of the mixture coatings are obtained which are distinguished from the dull and darker shaded coatings obtainable with aluminum alloys by a much greater metallic lustre and lighter shade.

In addition to aluminum and silicon, the alloys to be employed in accordance with the invention, may contain suitable admixtures of metallic or non-metallic substances, for instance, of such substances, which are adapted, to influence the coloring weather-proof character or the heat-radiating character. When aluminum-silicon alloys are employed such additions may be present, from the outset, as components of the alloys themselves, or be incorporated therewith only prior to use, for example during crushing.

The hereindescribed coloring and protective coatings can be applied in a great variety of ways. For example, a pulverized alloy, with a binding medium, for example of the hereinbefore described kind, can be applied to the surface that is to be coated, by brushing, spraying or by the dipping process or in any other way, or the dry powder may be applied, in a suitable manner, to the surface after the latter has been coated with a binding medium.

The preliminary conversion of the alloy into the form of powder which is required is very greatly facilitated—in contradistinction to the known method of pulverizing aluminum which can only be effected at great expense—by the relatively great brittleness of these alloys having a content of 20% silicon and upwards. However alloys which are poorer in silicon can be readily converted into a finely divided form as can obviously those having any desired higher silicon content by the per se known processes according to which molten alloys are atomized by means of a current of air steam or inert gases for example using a nozzle or by blowing a current of gas through a stream of the molten alloy issuing from the melting furnace.

The ready mixed paint has good keeping properties and merely needs stirring up before use.

It may be easily applied with a brush, or a paint-spraying gun, and produces a grey coating with a brownish tinge.

Example 1

500 to 600 grms. of aluminum-silicon alloy, very finely ground and subsequently air-sifted, said alloy being obtained by the liquation of an alloy lower in silicon, and containing about 32% of metallic aluminum and about 53% of metallic silicon (the remainder consisting of oxides and other compounds of these two metals), are stirred to a workable paint in a suitable manner with 500 to 400 grms. of a mixture of a suitable binding medium (such as for example boiled linseed oil) with a small quantity of copal and with a diluent (such as turpentine oil). Thus, for instance, the mass is brought into distributable condition in a suitable manner, for example with the aid of a mixing apparatus and a colloid mill.

The paint is applied in a suitable manner with a brush, or a paint-spraying gun, and furnishes a grey to dark grey coating.

According to the purpose in view, the boiled linseed oil may be replaced by lacquer varnish and the like.

In all cases the most suitable proportion of pigment to varnish depends, on the one hand, on the composition of the pigment and, on the other, the purpose in view (whether brushed or sprayed paint, linseed oil or lacquer paints, zapon lacquers, etc.). This proportion can easily be ascertained, in each case, by preliminary experiment.

The usual commercial driers and diluents can also be employed in a suitable manner, with these paints.

The terms "metallic aluminum" and "metallic silicon" are intended to include aluminum and silicon in the elementary condition in any form and are not limited to modifications having so-called metallic properties.

The term "alloy" in the specification and claims is not limited to materials containing definite intermetallic compounds of aluminum and silicon.

I claim:—

1. A coating and protective composition consisting of a paint vehicle and a pigment of an aluminum-silicon alloy, the silicon being present in an amount sufficient to increase the corrosive-resistant and heat transmission characteristics of a coating produced by said composition.

2. A coloring and protective coating composition comprising a vehicle and a pigment containing an alloy of aluminum and silicon distributed throughout said binding medium in finely divided form, said alloy containing at least 5% of silicon.

3. A coloring and protective coating composition comprising a vehicle and a pigment containing an aluminum-silicon alloy containing more than about 20% to about 60% of silicon, said pigment being distributed throughout said binding medium in finely-divided form.

4. A coloring and protective coating composition comprising a binding medium and a pigment containing an aluminum-silicon alloy containing an eutectic of about 87% of aluminum and about 13% of silicon, said pigment being distributed throughout said binding medium in finely-divided form.

5. A liquid coloring and protective composition comprising a liquid binding medium and a pigment containing an aluminum-silicon alloy containing more than about 20% of silicon and containing oxidic and other compounds of aluminum and silicon, said pigment being distributed throughout said binding medium in finely-divided form.

6. A liquid coloring and protective composition comprising a liquid binding medium and pigment containing an aluminum-silicon alloy containing more than about 20% of silicon and containing a non-metallic compound of at least one of said elements, said pigment being distributed throughout said binding medium in finely-divided form.

7. A liquid coloring and protective composition comprising linseed oil and a pigment containing an aluminum-silicon alloy containing more than about 20% of silicon, said pigment being distributed throughout said binding medium in finely-divided form.

8. A liquid coloring and protective composition comprising linseed oil, copal, and a pigment containing an aluminum-silicon alloy containing more than about 20% of silicon, said pigment being distributed throughout said binding medium in finely-divided form.

9. A liquid coloring and protective composition comprising linseed oil, turpentine and a pigment containing an aluminum-silicon alloy containing more than about 20% of silicon, said pigment being distributed throughout said binding medium in finely-divided form.

10. A liquid coloring and protective composition comprising linseed oil, copal, turpentine and a pigment containing an aluminum-silicon alloy containing more than about 20% of silicon, said pigment being distributed throughout said binding medium in finely-divided form.

11. A liquid coloring and protective composition comprising a liquid binding medium, a diluent and a pigment containing an aluminum-silicon alloy containing more than about 20% of silicon, said pigment being distributed throughout said binding medium in finely-divided form.

12. A liquid coloring and protective composition comprising a liquid binding medium, a resin, and a pigment containing an aluminum-silicon alloy containing more than about 20% of silicon, said pigment being distributed throughout said binding medium in finely-divided form.

OSKAR SCHOBER.